Oct. 25, 1932.  J. SHANKS  1,884,892
BATTERY TERMINAL
Filed July 6, 1931
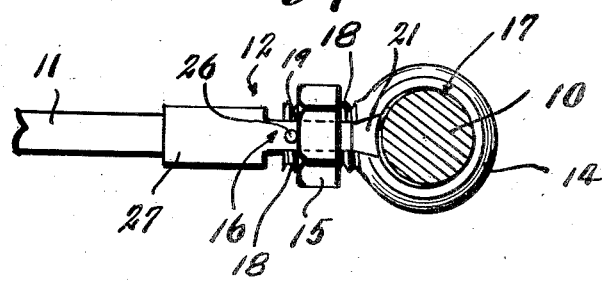
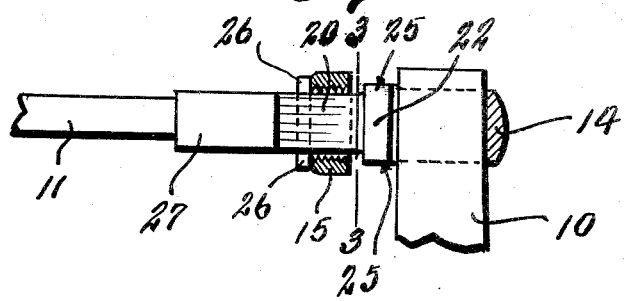
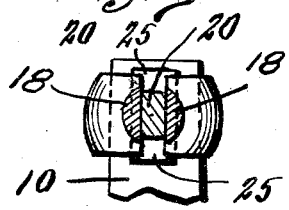
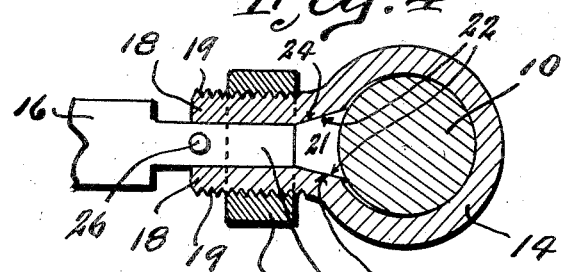
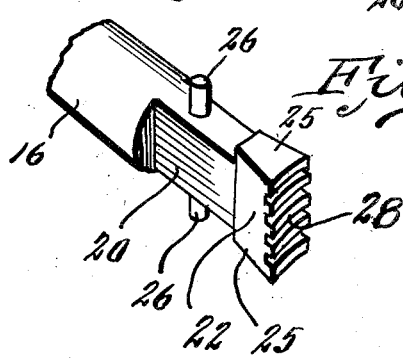
Inventor
Jacob Shanks
By William Janus
Atty.

Patented Oct. 25, 1932

1,884,892

UNITED STATES PATENT OFFICE

JACOB SHANKS, OF ST. LOUIS, MISSOURI

BATTERY TERMINAL

Application filed July 6, 1931. Serial No. 548,903.

This invention relates to new and useful improvements in cable terminals, the primary objects of the invention being the provision of a terminal which can be readily attached to and detached from the battery post and which is adapted to form a positive electrical contact therewith and which occupies but very little space and can be economically manufactured.

Other objects of the invention are to provide a cable terminal having a split ferrule terminating in a horizontally disposed threaded extension and having a nut screwseated on said threaded extension, there being a wedge member disposed between said extensions and provided on opposite ends with spaced shoulders or lateral projections engageable with said nut, whereby said wedge member is movable inwardly relatively to said ferrule to cause the inner edge of said wedge member to press against said post and clamp said ferrule in position and at the same time provide a positive electrical contact therewith, said wedge member being movable in opposite direction by the reverse movement of said nut so as to move the inner end of said wedge member from said post and cause spreading of said threaded extensions and of said ferrule so as to facilitate the separation and removal of the latter from the post.

With these and other objects in view, my invention consists in certain novel features of construction and arrangement of parts, hereinafter more fully described and claimed, and illustrated in the accompanying drawing, in which—

Figure 1 is a top plan view of my improved terminal showing the battery post in cross section.

Figure 2 is a vertical cross section through the terminal.

Figure 3 is a transverse vertical cross section taken on line 3—3 of Figure 2.

Figure 4 is an enlarged horizontal cross section showing the wedge member in inward position and in engagement with the battery post.

Figure 5 is a perspective detail view of the movable or wedge member.

Referring by numerals to the accompanying drawing, 10 indicates a post of a battery, 11 a cable, and 12 a terminal or connector secured to said cable and adapted to be detachably engaged with said post.

Each terminal consists of a ferrule 14, an actuating nut 15, and a longitudinally movable member or wedge 16.

The ferrule 14 is provided with a vertically disposed bore or opening 17 of suitable contour to receive the post 10. This ferrule is split and each end thereof terminates in a radial extension 18 which is segmental in cross section and is provided with an external screw thread 19.

The nut 15 is screw-seated on said extensions, the thickness of each extension being less than the radius of the bore of the nut so that said extensions are adapted to receive therebetween the shank portion 20 of wedge member 16. The height of this shank portion is slightly less than the diameter of the threaded bore of the nut so that said nut can operate freely on said extensions.

The inner end of member 16 terminates in a wedge 21 with the wide portion thereof presented inwardly and preferably curved transversely on the same radius as that of the bore of the ferrule. The tapering faces 22 of the wedge engage correspondingly tapered walls 24 of the extensions. Consequently when member 16 is moved outwardly relatively to the ferrule, the extensions are spread apart and the ferrule is expanded so as to increase the diameter thereof with respect to the post 10. The movement of the wedge member in opposite direction causes the wedge or inner end thereof to move inwardly against the post, thereby clamping the ferrule in position thereon.

The movement of the wedge member 16 relatively to the ferrule is accomplished by the actuation of the nut 15 on the threaded extensions 18. The member 16 has its wedge portion 21 terminating in shoulders 25 which extend in opposite directions and are engaged by the nut 15 when the latter is turned in a direction to bring it against the ferrule. This causes the wedge member to move inwardly and force the face of the wedge against the post 10, thereby clamping the ferrule in position and establishing positive electrical contact between the post and the wedge member.

A pin 26 is driven vertically into the shank portion 20 in spaced relation with shoulders 25 and on the opposite side of nut 15. Thus when the latter is turned in opposite direction it bears against the projecting ends of said pin and causes the member 16 to move outwardly whereby the wedge 21 is moved away from the post and between the tapering walls 24 of the extensions 18, thereby causing spreading apart of said extensions and the consequent spreading of the ferrule so as to cause separation thereof from the post. Thus the diameter of the ferrule is increased so that the latter can be easily removed from the post.

The outer end of member 16 terminates in a socket 27 into which the end of cable 11 is soldered. Thus a direct electrical contact is established between the cable and the post when the inner end of the member 16 is forced thereagainst and the ferrule is used only as attaching means. Preferably the extensions 18 are formed slightly tapered outwardly so as to permit the spreading apart thereof and of the ferrule when the nut 15 is moved away from the post and permit clamping or drawing together of said extensions when the nut is turned in the opposite direction and the wedge is moved inwardly.

Preferably the face of the wedge is provided with serrations or projections 28 (as shown in Figure 5) which when the wedge is forced in engagement with the post insure positive electrical contact therewith.

I claim:

1. In a battery terminal, the combination of a split ferrule having radial extensions provided with external screw threads, a longitudinally movable member disposed between said extensions and provided with longitudinally spaced projections, and a nut screw-seated on said extensions and adapted when operable in one direction to engage one of said projections and produce inward movement of said movable member whereby the inner end thereof moves against the post, said nut being operable in another direction to engage the other projection and cause the inner end of said movable member to move outwardly between said extensions away from said post and cause expansion of said ferrule.

2. In a battery terminal, a ferrule split longitudinally and having its ends terminating in outwardly projecting radial extensions, said extensions being provided adjacent to said ferrule with oppositely disposed tapering faces, a longitudinally disposed member disposed between said extensions and having its inner end provided with an outwardly presented wedge adapted to engage the tapering faces of said extensions, and a nut screw-seated on said extensions and engageable with said longitudinally movable member whereby the operation of said nut in one direction causes longitudinal inward movement of said movable member to bring the inner end thereof against the post and clamp said ferrule in position and the operation of said nut in opposite direction causes reverse longitudinal movement of said member and brings the wedge thereof against the tapering faces of said extensions and spreads apart said extensions and expands said ferrule.

3. An electrical terminal comprising a split ferrule terminating in radial extensions externally threaded, a wedge member disposed between said extensions and having its inner end formed in a wedge and a nut screw-seated on said extensions and cooperating with said wedge member, whereby the actuation of said nut in one direction causes inward movement of said wedge member so as to bring the inner end thereof against the post, thereby clamping said ferrule in position, and whereby the actuation of said nut in the opposite direction causes retractive movement of said wedge member and brings the wedge thereof away from said post and between said extensions to spread the latter apart and expand said ferrule so that the latter can be removed from the post.

4. A battery terminal comprising in combination with a battery post, of a split ferrule terminating in spaced-apart radial extensions, a movable member disposed between said extensions and having its inner end terminating in a wedge and provided with projections spaced longitudinally, and a nut screw-seated on said extensions and operable in one direction to engage one of said projections and cause inward movement of said member so as to clamp the battery post between the inner end thereof and said ferrule, said nut being operable in opposite direction to engage the other extension and cause retraction of said movable member so as to bring said wedge between said extensions and cause expansion of said ferrule.

5. In a device of the class described, the combination of a split ferrule terminating in spaced radial extensions, a movable member disposed between said extensions and having its inner end terminating in a wedge presented within said ferrule, said movable member being provided with longitudinally spaced projections, and actuating means operatively mounted on said extensions and movable in one direction to engage one of said projections and cause the inward movement of said movable member so as to bring the wedge end thereof inwardly, said means being operable in opposite direction to engage the other projection and cause outward movement of said movable member so as to bring the wedge between said extensions and cause spreading of said ferrule.

6. In a battery terminal, the combination of a split sleeve having a split radial extension threaded externally, a longitudinally movable member disposed between said split portions of said radial extension, a nut screw-seated on said extension and rotative relatively to said longitudinal member, and means on said longitudinal member and engaging said nut, whereby the rotation of said nut in one direction moves said longitudinal member inwardly into said sleeve and the rotation of said nut in opposite direction causes retraction of said longitudinal member.

In testimony whereof I hereunto affix my signature this 3rd day of July, 1931.

JACOB SHANKS.